(12) United States Patent
Pereira et al.

(10) Patent No.: US 10,922,701 B2
(45) Date of Patent: Feb. 16, 2021

(54) SYSTEMS AND METHODS FOR CHARACTERIZING GEOGRAPHIC REGIONS

(71) Applicant: MasterCard International Incorporated, Purchase, NY (US)

(72) Inventors: Lisiane Cristine de Assis Pereira, São Paulo (BR); Stephanie Busse, Miami, FL (US); Shikha Goel Mittal, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 936 days.

(21) Appl. No.: 15/221,742

(22) Filed: Jul. 28, 2016

(65) Prior Publication Data

US 2018/0033023 A1 Feb. 1, 2018

(51) Int. Cl.
*G06Q 30/02* (2012.01)
(52) U.S. Cl.
CPC .................. *G06Q 30/0201* (2013.01)
(58) Field of Classification Search
CPC combination set(s) only.
See application file for complete search history.

(56) References Cited

U.S. PATENT DOCUMENTS

| | | | |
|---|---|---|---|
| 6,741,188 B1 | 5/2004 | Miller et al. |
| 7,385,501 B2 | 6/2008 | Miller et al. |
| 7,525,450 B2 | 4/2009 | Miller et al. |
| 7,565,157 B1 | 7/2009 | Ortega et al. |
| 7,774,002 B1 | 8/2010 | Ortega et al. |
| 7,774,003 B1 | 8/2010 | Ortega et al. |
| 7,843,331 B2 | 11/2010 | Miller et al. |
| 7,843,332 B2 | 11/2010 | Miller et al. |
| 7,847,685 B2 | 12/2010 | Miller et al. |

(Continued)

OTHER PUBLICATIONS

Noulas et al, A Random Walk Around the City: New Venue Recommendation in Location-Based Social Networks, 2012, 2012 ASE/IEEE International Conference on Social Computing and 2012 ASE/IEEE International Conference on Privacy, Security, Risk and Trust, p. 1-10. (Year: 2012).*

*Primary Examiner* — Marie P Brady
(74) *Attorney, Agent, or Firm* — Armstrong Teasdale LLP

(57) ABSTRACT

An analytics reporting computing device for generating a region report of a geographic region is described. The analytics reporting computing device is configured to receive a request for a region report, the request identifying a geographic region including a plurality of sub-regions and at least one selected region characteristic, and identify each sub-region. The analytics reporting computing device is also configured to retrieve transaction data and influence data associated with the geographic region, the influence data including electronic data representing user online social behavior. The analytics reporting computing device is further configured to, for each sub-region, determine a respective index score of the selected region characteristic based upon portions of the transaction data and influence data associated with each sub-region. The analytics reporting computing device is further configured to generate the region report ranking each of the sub-regions according to their index scores, and transmit the region report for display.

19 Claims, 6 Drawing Sheets

(56) References Cited

U.S. PATENT DOCUMENTS

| | | |
|---|---|---|
| 7,859,402 B2 | 12/2010 | Miller et al. |
| 7,982,599 B2 | 7/2011 | Miller et al. |
| 8,055,282 B1 | 11/2011 | Ortega et al. |
| 8,437,778 B1 | 5/2013 | Ortega et al. |
| 9,195,998 B2 | 11/2015 | Den Herder et al. |
| 9,245,277 B1 | 1/2016 | Chavarria et al. |
| 9,373,131 B1 | 6/2016 | Hosny |
| 2006/0064400 A1* | 3/2006 | Tsukerman ............. G06F 16/27 |
| 2009/0018996 A1 | 1/2009 | Hunt et al. |
| 2009/0132469 A1 | 5/2009 | White et al. |
| 2009/0192875 A1 | 7/2009 | Bene et al. |
| 2009/0192876 A1 | 7/2009 | De et al. |
| 2009/0299820 A1 | 12/2009 | Wang et al. |
| 2010/0049538 A1 | 2/2010 | Frazer et al. |
| 2010/0306032 A1 | 12/2010 | Jolley |
| 2011/0191184 A1 | 8/2011 | Blackhurst et al. |
| 2011/0246260 A1 | 10/2011 | Gilbert et al. |
| 2011/0246306 A1 | 10/2011 | Blackhurst et al. |
| 2011/0282860 A1* | 11/2011 | Baarman ............... G06F 16/951 707/709 |
| 2012/0066065 A1 | 3/2012 | Switzer |
| 2013/0124263 A1* | 5/2013 | Amaro ................... G06Q 30/02 705/7.34 |
| 2014/0074817 A1* | 3/2014 | Neels ..................... G06F 3/0482 707/711 |
| 2014/0108320 A1 | 4/2014 | Baca et al. |
| 2014/0195931 A1* | 7/2014 | Kwon .................... G06Q 30/02 715/753 |
| 2014/0278799 A1* | 9/2014 | McLean ............. G06Q 30/0204 705/7.33 |
| 2014/0358943 A1 | 12/2014 | Raymond et al. |
| 2016/0335649 A1* | 11/2016 | Ghosh ............. G06Q 10/06393 |
| 2017/0235792 A1* | 8/2017 | Mawji ................... G06F 16/248 707/769 |

\* cited by examiner

500

502 — RECEIVING A REQUEST FOR A REGION REPORT FROM A CLIENT COMPUTING DEVICE, THE REGION REPORT REQUEST IDENTIFYING A PREDEFINED GEOGRAPHIC REGION INCLUDING A PLURALITY OF SUB-REGIONS AND AT LEAST ONE SELECTED REGION CHARACTERISTIC SELECTED BY A USER OF THE CLIENT COMPUTING DEVICE

504 — IDENTIFYING EACH SUB-REGION INCLUDED WITHIN THE PREDEFINED GEOGRAPHIC REGION

506 — RETRIEVING TRANSACTION DATA REPRESENTING A PLURALITY OF FINANCIAL TRANSACTIONS INITIATED BY A PLURALITY OF CARDHOLDERS AT A PLURALITY OF MERCHANTS WITHIN EACH IDENTIFIED SUB-REGION

508 — RETRIEVING INFLUENCE DATA ASSOCIATED WITH THE PREDEFINED GEOGRAPHIC REGION, THE INFLUENCE DATA INCLUDING ELECTRONIC DATA REPRESENTING USER ONLINE SOCIAL BEHAVIOR RELATING TO THE PREDEFINED GEOGRAPHIC REGION

510 — FOR EACH IDENTIFIED SUB-REGION, DETERMINING A RESPECTIVE INDEX SCORE OF THE AT LEAST ONE SELECTED REGION CHARACTERISTIC BASED UPON RESPECTIVE PORTIONS OF THE TRANSACTION DATA AND INFLUENCE DATA ASSOCIATED WITH EACH IDENTIFIED SUB-REGION

512 — GENERATING THE REGION REPORT, WHEREIN THE REGION REPORT RANKS EACH OF THE IDENTIFIED SUB-REGIONS ACCORDING TO THE RESPECTIVE INDEX SCORES OF THE SELECTED REGION CHARACTERISTIC

514 — TRANSMITTING THE NEIGHBORHOOD REPORT TO THE CLIENT COMPUTING DEVICE FOR DISPLAY

FIG. 5

SYSTEMS AND METHODS FOR CHARACTERIZING GEOGRAPHIC REGIONS

BACKGROUND

This disclosure relates to characterizing geographic regions, and more specifically to network-based systems and methods for processing electronic signals retrieved from a payment network, social media networks, and/or other data streams, and characterizing geographic regions based upon transaction and influence data associated with those geographic regions.

When any individual or other entity (e.g., a company or franchisee) is interested in relocating to a new region, they may be interested in learning about the neighborhoods in that new region but may have difficulty gathering the necessary information to address their questions. They may be completely unfamiliar with the region and associated neighborhoods or at least unfamiliar with certain aspects of the region, such as the merchants in each neighborhood or the demographics of the neighborhood. In at least some cases, potential residents may tend to desire living near other people with similar socioeconomic statuses and interests. Additionally, merchants benefit from establishing locations in areas in which their customers are located. Accordingly, if a merchant establishes a location in a neighborhood without customers who are interested in and financially able to purchase goods from that merchant, then that merchant may struggle financially.

Unfortunately, information about regions and sub-regions therein is oftentimes distributed across multiple disparate sources, and it is therefore difficult to obtain an overall impression of the region. Currently, users are forced to perform individual research for each "area of interest" (e.g., hobbies, dining, and entertainment), to fulfill each of their distinct needs, or use other forms of research such as word of mouth, physical exploration, newspapers, and the like. Moreover, while realtors familiar with the area may have formed an opinion of the area, they are prevented by regulations from sharing certain opinions and information, such as socioeconomic profiles of the residents, with potential buyers or renters of real estate in the geographic area.

BRIEF DESCRIPTION OF THE DISCLOSURE

In one aspect, an analytics reporting computing device for generating a region report of a predefined geographic region is provided. The analytics reporting computing device includes a processor coupled to a memory. The analytics reporting computing device is configured to receive a request for a region report from a client computing device, the region report request identifying a predefined geographic region including a plurality of sub-regions and at least one selected region characteristic selected by a user of the client computing device, and identify each sub-region included within the predefined geographic region. The analytics reporting computing device is also configured to retrieve transaction data representing a plurality of financial transactions initiated by a plurality of cardholders at a plurality of merchants within each identified sub-region, and retrieve influence data associated with the predefined geographic region, the influence data including electronic data representing user online social behavior relating to the predefined geographic region. The analytics reporting computing device is further configured to, for each identified sub-region, determine a respective index score of the at least one selected region characteristic based upon respective portions of the transaction data and influence data associated with each identified sub-region. The analytics reporting computing device is still further configured to generate the region report, wherein the region report ranks each of the identified sub-regions according to the respective index scores of the at least one selected region characteristic, and transmit the region report to the client computing device for display.

In another aspect, a method for ranking sub-regions within a predefined geographic region is provided. The method is implemented by an analytics reporting computing device including one or more processors in communication with a memory. The method includes receiving a request for a region report from a client computing device, the region report request identifying a predefined geographic region including a plurality of sub-regions and at least one selected region characteristic selected by a user of the client computing device, and identifying each sub-region included within the predefined geographic region. The method also includes retrieving transaction data representing a plurality of financial transactions initiated by a plurality of cardholders at a plurality of merchants within each identified sub-region, and retrieving influence data associated with the predefined geographic region, the influence data including electronic data representing user online social behavior relating to the predefined geographic region. The method further includes for each identified sub-region, determining a respective index score of the at least one selected region characteristic based upon respective portions of the transaction data and influence data associated with each identified sub-region. The method still further includes generating the region report, wherein the region report ranks each of the identified sub-regions according to the respective index scores of the at least one selected region characteristic, and transmitting the region report to the client computing device for display.

In yet another aspect, a non-transitory computer-readable storage medium having computer-executable instructions embodied thereon, wherein when executed by an analytics reporting computing device including at least one processor coupled to a memory, the computer-executable instructions cause the analytics reporting computing device to receive a request for a region report from a client computing device, the region report request identifying a predefined geographic region including a plurality of sub-regions and at least one selected region characteristic selected by a user of the client computing device, and identify each sub-region included within the predefined geographic region. The computer-executable instructions also cause the analytics reporting computing device to retrieve transaction data representing a plurality of financial transactions initiated by a plurality of cardholders at a plurality of merchants within each identified sub-region, and retrieve influence data associated with the predefined geographic region, the influence data including electronic data representing user online social behavior relating to the predefined geographic region. The computer-executable instructions further cause the analytics reporting computing device to for each identified sub-region, determine a respective index score of the at least one selected region characteristic based upon respective portions of the transaction data and influence data associated with each identified sub-region. The computer-executable instructions also cause the analytics reporting computing device to generate the region report, wherein the region report ranks each of the identified sub-regions according to the respective index scores of the at least one selected region characteristic, and transmit the region report to the client computing device for display.

BRIEF DESCRIPTION OF THE DRAWINGS

FIGS. 1-6 show example embodiments of the methods and systems described herein.

FIG. 1 is a simplified block diagram of an example region characterizing system including an analytics reporting computing device, a client computing device, and a plurality of data reporting computing devices in accordance with one example embodiment of the present disclosure.

FIG. 2 illustrates a configuration of a client system shown in FIG. 1 in accordance with one example embodiment of the present disclosure.

FIG. 3 illustrates a configuration of a server system shown in FIG. 1 in accordance with one example embodiment of the present disclosure.

FIG. 4 is an example diagram illustrating the flow of information between components of the region characterizing system shown in FIG. 1.

FIG. 5 is a flowchart of an example method of ranking sub-regions within a predefined geographic region relative to other sub-regions using the region characterizing system shown in FIG. 1.

FIG. 6 is a diagram 600 of components of one or more example computing devices that may be used in the region characterizing system shown in FIG. 1 to rank sub-regions within a predefined geographic region.

DETAILED DESCRIPTION OF THE DISCLOSURE

Figure 1:
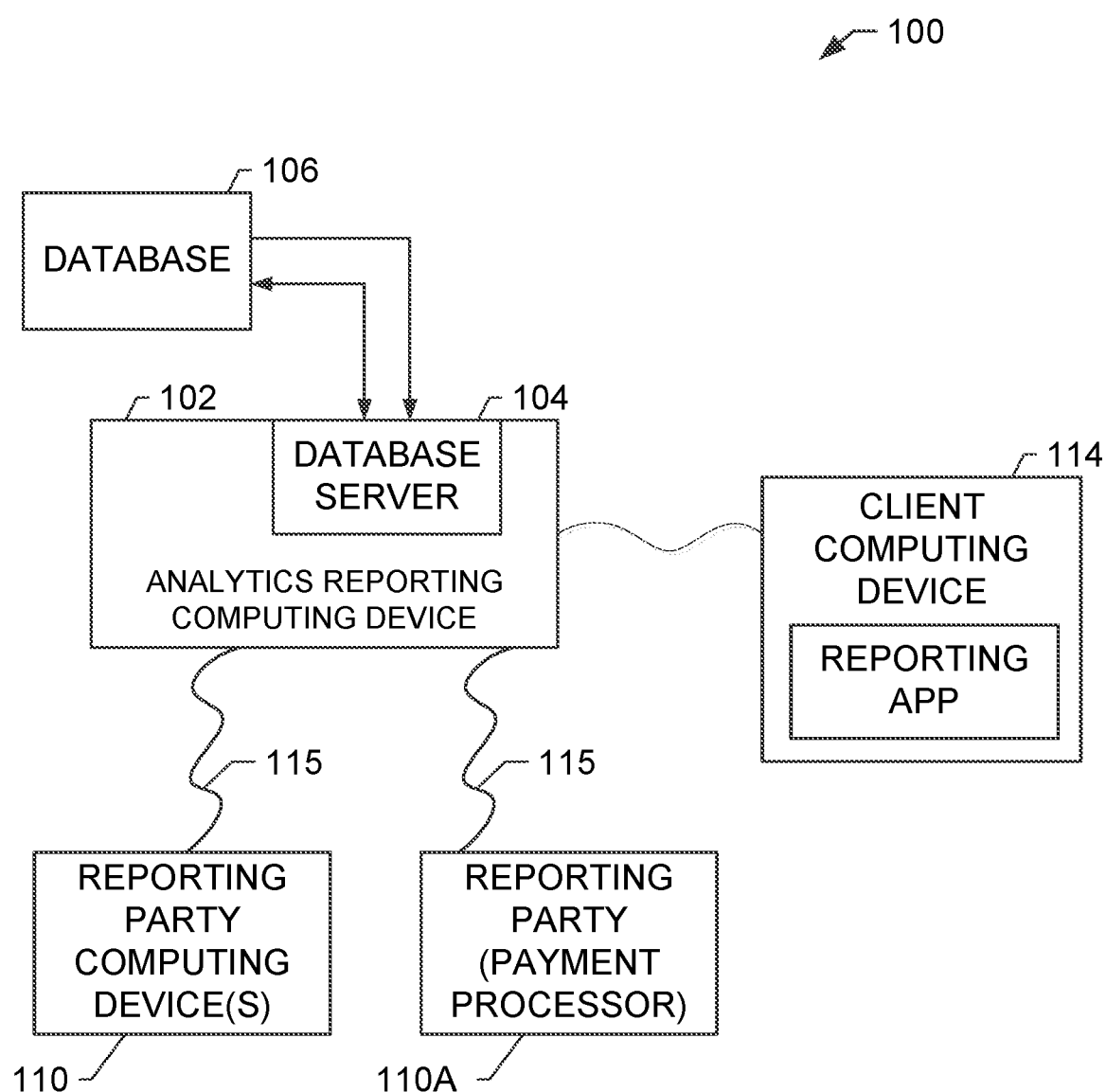

The systems and methods described herein are directed to characterizing geographic regions. More specifically, the systems and methods described herein are directed to processing electronic signals from a payment network, social media networks, and/or other data streams, and ranking certain sub-regions within the geographic region relative to other sub-regions based upon transaction and influence data associated with those geographic sub-regions. The systems and methods then generate and provide region reports to users (including individuals and other entities) about the particular geographic regions.

The region characterizing system described herein includes an analytics reporting computing device. The analytics reporting computing device includes a processor coupled to a memory. The region characterizing system also includes at least one client computing device in communication with the analytics reporting computing device. The client computing device may include any device capable of communication with the analytics reporting computing device including, for example, a smart phone, a tablet, a personal computer, and/or a wearable computing device (e.g., a "smart watch" or "smart glasses").

The analytics reporting computing device receives a request for a region report from the client computing device. In some embodiments, a user of the client computing device generates and transmits the request from within an app on their client computing device. The request specifies a geographic region of interest (e.g., a state, county, city, etc.). The user may also select one or more region characteristics in the request, wherein selection of the region characteristics directs the analytics reporting computing device to rank sub-regions (e.g., zip codes, zip+4 codes, and/or otherwise-defined sub-regions) within the geographic region according to the selected region characteristics. Region characteristics include, for example, purchasing power, age, family size, employment, spending patterns, merchant type availability, social behavior, housing trends, etc., associated with a particular neighborhood. "Sub-regions" or neighborhoods are represented herein according to zip code. However, it should be understood that sub-regions may be alternatively defined, for example, based on coordinates, ranges, maps, etc.

The analytics reporting computing device is configured to retrieve, process, and analyze a plurality of data streams, described below, in order to determine how each sub-regions ranks, relative to other sub-regions in the geographic region, according to the selected region characteristic(s). More specifically, the analytics reporting computing device calculates a value or index sub-score associated with each sub-region within the geographic region, each value corresponding to particular region characteristics. For example, one sub-region may have a higher index sub-score for a "purchasing power" region characteristic but a lower index sub-score for an "age" or "family size" region characteristic. A lower index sub-score may represent deviation from a user preference (e.g., a median age further from a user-selected "preferred" median age) or may correlate to values of particular metrics (e.g., a lower index sub-score may correspond to a lower median age). The analytics reporting computing device ranks the sub-region on how they compare on the selected region characteristic(s), generating a (total) index score based on the individual index sub-scores. The analytics reporting computing device transmits the index score back to the client computing device within a region report. In some embodiments, the region report is displayed to the user at the client computing device within the app. The region report may be displayed as a list, as a map, as a chart or graph, and/or in any other format.

The region characterizing system may further include a payment processor, which is associated with a payment processing network. Cardholders (e.g., an entity using a payment card such as a credit card, a debit card, or a prepaid card) initiate payment transactions to pay for purchases from merchants. Transaction data associated with these payment transactions are received and processed over the payment processing network, by the payment processor. The payment processor may collect and transmit the transaction data. The transaction data may include data identifying the cardholder and the merchant, an approximate merchant location (e.g., an address of a shopping center), a timestamp associated with the transaction, and a point-of-sale (POS) terminal involved in the payment transaction. In some cases, the transaction data may also include SKU or other item-level data identifying the items (e.g., products and/or services) being purchased. The analytics reporting computing device requests and/or retrieves transaction data associated with each sub-region within the geographic region from the payment processor. The analytics reporting computing device then processes the transaction data to determine certain transactional analytics for each sub-region, including location traffic (e.g., number of transactions), transaction size (e.g., average transaction size for a region or for a group of merchants), types of goods purchased, spending trends, and "purchasing power" or monthly spend of cardholders. Consumers in individual sub-regions may be grouped into "spending bands" based on average monthly spend. Average monthly spend may be weighted or divided according to family size and/or age group. Consumers may additionally or alternatively be determined based on a proportion of that monthly spend spent on essentials vs. high-end brands, etc. Proportions of spending bands within a particular sub-region may then be determined.

The region characterizing system may also include at least one influence data reporting party, configured to collect influence data. "Influence data" includes electronic data about a region derived from social, cultural, and/or other not specifically economic behavior, more particularly, online behavior related to the region. For example, influence data may include most-visited locations within a region (e.g., check-ins), trends, particular preferred brands, interests/likes within the region, and/or information from local influencers (e.g., local users with social influence). A local influencer may be designated as such based on a number of local "followers," an amount of local online traffic, and/or according to any other metric, wherein "local" refers to the geographic region. Influence data may be an indicator of the behaviors and neighborhood of people in the geographic region. In the example embodiment, influence data is generated based on user behavior on social networks and other online behavior (e.g., searching, commenting, visiting web pages, etc.). The analytics reporting computing device is configured to request and/or retrieve influence data associated with the geographic region and/or with the individual sub-regions therein from an influence data reporting computing device. The analytics reporting computing device then processes the influence data to determine certain influence metrics for each sub-region, such as brand interest trends, most visited web pages, etc.

The region characterizing system may further include at least one geodemographic data reporting party, such as credit reporting agencies or other third parties that collect demographic/socioeconomic data. The geodemographic data reporting party transmits the geodemographic data to the analytics reporting computing device for processing. "Geodemographic data" includes "demographic data" and/or "socioeconomic data" associated with a particular geographic region (e.g., a zip code). Geodemographic data may also include census data.

Geodemographic data includes, for example, age groups, family/household sizes, income, education, gender, occupation, marital status, living situation (e.g., renter vs. homeowner), vehicle situation (e.g., owning a car vs. not owning a car, type/make/model of car, year of car), population density, housing type (single-family vs. multi-family, vacancy levels, etc.), and labor force information (e.g., employment levels). The analytics reporting computing device is configured to request and/or retrieve geodemographic data associated with the geographic region and/or with the individual sub-regions therein from a geographic data reporting computing device. The analytics reporting computing device then processes the geodemographic data to determine certain geodemographic metrics for each sub-region, such as resident types, median or average age, etc.

The region characterizing system may also include a merchant data reporting party, configured to collect merchant information. The merchant data reporting party transmits merchant data to the analytics reporting computing device for processing. "Merchant data" includes data about merchants within the geographic region, which includes merchants associated with transactions initiated within the geographic region. Merchant data includes, for example, most commonly visited merchants, merchant industries, channels (e.g., brick-and-mortar vs. online), merchant reviews, open and close times, and merchant features. The analytics reporting computing device is configured to request and/or retrieve merchant data associated with the geographic region and/or with the individual sub-regions therein from a merchant data reporting computing device. The analytics reporting computing device then processes the merchant data to determine certain merchant metrics for each sub-region, such as the most commonly visited merchants, merchant variation, merchant availability, etc.

The region characterizing system may still further include at least one ATM data reporting party, configured to collect ATM data. The ATM data reporting party transmits ATM data to the analytics reporting computing device for processing. "ATM data" includes data about ATMs within the geographic region. ATM data includes, for example, locations of specific ATMs, a number of ATMs, ATM types (financial institute, university, etc.), acquirer information associated with ATMs, owner information associated with ATMs, and accessibility (inside vs. outside, handicap accessible, etc.). The analytics reporting computing device is configured to request and/or retrieve ATM data associated with the geographic region and/or with the individual sub-regions therein from an ATM data reporting computing device. The analytics reporting computing device then processes the ATM data to determine certain ATM metrics for each sub-region, such as ATM availability, ATM accessibility, etc.

The methods and systems described herein may be implemented using computer programming or engineering techniques including computer software, firmware, hardware or any combination or subset thereof, wherein the technical effect is achieved by performing at least one of: (a) receiving a request for a region report from a client computing device, the region report request identifying a predefined geographic region including a plurality of sub-regions and at least one selected region characteristic selected by a user of the client computing device; (b) identifying each sub-region included within the predefined geographic region; (c) retrieving transaction data representing a plurality of financial transactions initiated by a plurality of cardholders at a plurality of merchants within each identified sub-region; (d) retrieving influence data associated with the predefined geographic region, the influence data including electronic data representing user online social behavior relating to the predefined geographic region; (e) for each identified sub-region, determining a respective index score of the at least one selected region characteristic based upon respective portions of the transaction data and influence data associated with each identified sub-region; (f) generating the region report, wherein the region report ranks each of the identified sub-regions according to the respective index scores of the at least one selected region characteristic; and (g) transmitting the region report to the client computing device for display.

More specifically, an analytics reporting computing device described herein is specially programmed with computer code to perform the above processes. The technical effects described herein apply to the technical field of characterizing a geographic region, or more specifically, characterizing and ranking sub-regions within the geographic to one another. The systems and methods described herein provide the technical advantage of leveraging payment transaction data and influence data (i.e., electronic data representative of online social behavior within and/or associated with the geographic region) to quantitatively rank sub-regions within the geographic region according to how the sub-regions compare. Such systems and methods could not be implemented prior to the existence of both payment processing networks and the Internet, because neither transaction data nor influence data would be available thereto.

Accordingly, by implementing the systems and methods described herein, potential residents and/or merchants may efficiently determine whether a particular geographic region is a good fit for their family or business based on their own preferred region characteristics. No current system or methods enable the gathering and processing of disparate electronic data streams to report a quantitative sub-region ranking as described herein. The systems and methods herein provide a computer-implemented method that not only replaces manual searching to try to characterize a sub-region or neighborhood but, in fact, improves upon any prior neighborhood characterization methods by quantitatively ranking zip codes (or other sub-regions) relative to other zip codes, with respect to a user's preferred region characteristics.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a simplified block diagram of an example region characterizing system 100 for characterizing a geographic region. More particularly, region characterizing system 100 characterizes sub-regions within the geographic region and quantitatively compares the sub-regions relative to one another in a region report. In the example embodiment, region characterizing system 100 includes a plurality of computing devices connected in communication in accordance with the present disclosure. More specifically, region characterizing system 100 includes an analytics reporting computing device 102. Analytics reporting computing device 102 is configured to retrieve and process data from a plurality of data streams to rank sub-regions within a geographic region, and generate and transmit a region report associated with the geographic region. The region report includes an index score for each of a plurality of sub-regions within the geographic region, the index score rating the corresponding sub-region based on one or more region characteristics of the sub-region (e.g., in comparison to one or more other sub-regions within the geographic region).

Additionally, a database server 104 is connected to a database 106, which contains information on a variety of matters, as described below in greater detail. In one embodiment, centralized database 106 is stored on analytics reporting computing device 102. In an alternative embodiment, database 106 is stored remotely from analytics reporting computing device 102 and may be non-centralized. Database 106 may include a single database having separated sections or partitions or may include multiple databases, each being separate from each other. Database 106 may store transaction data generated as part of sales activities and conducted over a processing network including data relating to merchants, account holders or customers, issuers, acquirers, savings amounts, savings account information, and/or purchases made. Database 106 may also store data received from one or more reporting party computing devices 110, as described in further detail herein, such as influence data, merchant data, geodemographic data, ATM data, and/or any other information.

Region characterizing system 100 further includes a plurality of reporting party computing devices 110, each associated with a different reporting party. Analytics reporting computing device 102 is configured to retrieve different kinds of data from reporting party computing devices 110 for the generation of the region reports. In the illustrated embodiment, one reporting party computing device 110 in communication with analytics reporting computing device 102 is a payment processor 110A.

Payment processor 110A collects and/or stores transaction data associated with financial transactions (e.g., purchases) initiated by consumers using a payment card over a payment processing network (not shown). In a typical transaction card system, a financial institution called the "issuer" issues a transaction card, such as a credit card, to a consumer or cardholder, who uses the transaction card to tender payment for a purchase from a merchant. To accept payment with the transaction card, the merchant must normally establish an account with a financial institution that is part of the financial payment system. This financial institution is usually called the "merchant bank," the "acquiring bank," or the "acquirer." When the cardholder tenders payment for a purchase with a transaction card, the merchant requests authorization from a merchant bank for the amount of the purchase, for example, by receiving account information associated with the cardholder and communicating the account information to the merchant bank. Using a payment processor, the merchant will communicate with the issuer bank to determine whether the cardholder's account is in good standing and whether the purchase is covered by the cardholder's available credit line. Based on these determinations, the request for authorization will be declined or accepted. If a request for authorization is accepted, the available credit line of the cardholder's account is decreased. If the cardholder uses a debit card, the available funds in the cardholder's account will be decreased. The payment processor may store the transaction card information, such as a type of merchant, amount of purchase, date of purchase, in a database (e.g., database 106).

After a purchase has been made, a clearing process occurs to transfer additional transaction data related to the purchase among the parties to the transaction. More specifically, during and/or after the clearing process, additional data, such as a time of purchase, a merchant name, a type of merchant, purchase information, account-holder account information, a type of transaction, savings information, information regarding the purchased item and/or service, and/or other suitable information, is associated with a transaction and transmitted between parties to the transaction as transaction data. Payment processor 108 may store the transaction data (e.g., in an aggregated, anonymized, and/or encrypted format) in database 106.

At least one client computing device 114 (also referred to as user computing devices 114) is in communication analytics reporting computing device 102. Client computing devices 114 could be any device capable of interconnecting to the Internet including a web-based or "smart" phone, PDA, tablet, personal computer, wearable device (e.g., a smart watch or smart glasses), or other web-based connectable equipment. In the example embodiment, client computing devices 114 are sources of one or requests for region reports, as described further herein. At least some components of region characterizing system 100 are interconnected to the Internet through many interfaces including a network 115, such as a local area network (LAN) or a wide area network (WAN), dial-in-connections, cable modems, special high-speed Integrated Services Digital Network (ISDN) lines, and RDT networks.

Figure 2:
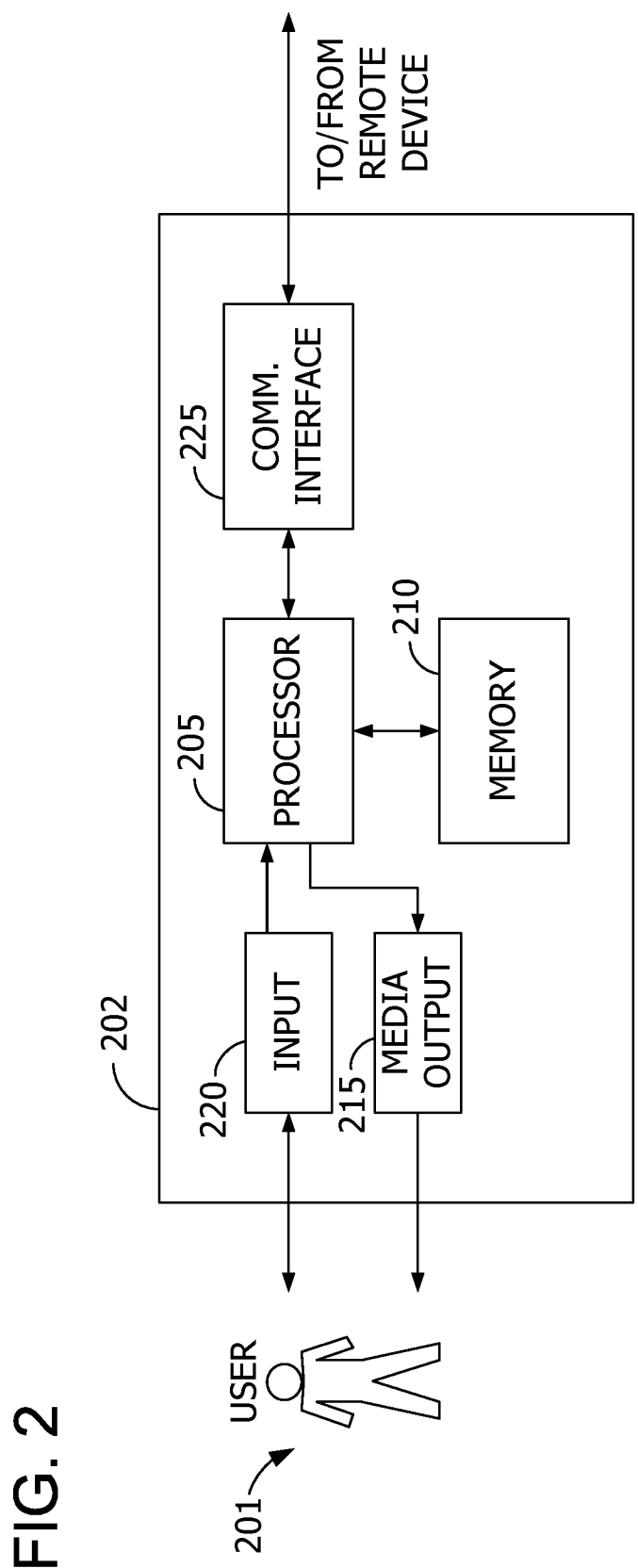

FIG. 2 illustrates an example configuration of a client computing device 202. Client computing device 202 may include, but is not limited to, client systems ("client computing devices") 114. Client computing device 202 may be operated by a user 201 (e.g., a cardholder, consumer, and/or other party interested in locating/re-locating to a geographic region)

Client computing device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer-readable media.

Client computing device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

Client computing device 202 may also include a communication interface 225, which is communicatively couplable to a remote device such as analytics reporting computing device 102 (shown in FIG. 1). Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer-readable instructions for providing a user interface to user 201 via media output component 215 and, optionally, receiving and processing input from input device 220. A user interface may include, among other possibilities, a web browser and client software application. Web browsers enable users 201 to display and interact with media and other information typically embedded on a web page or a website from a web server associated with another party, such as analytics reporting computing device 102. A client software application allows users 201 to interact with a server-maintained application associated with another party.

Figure 3:
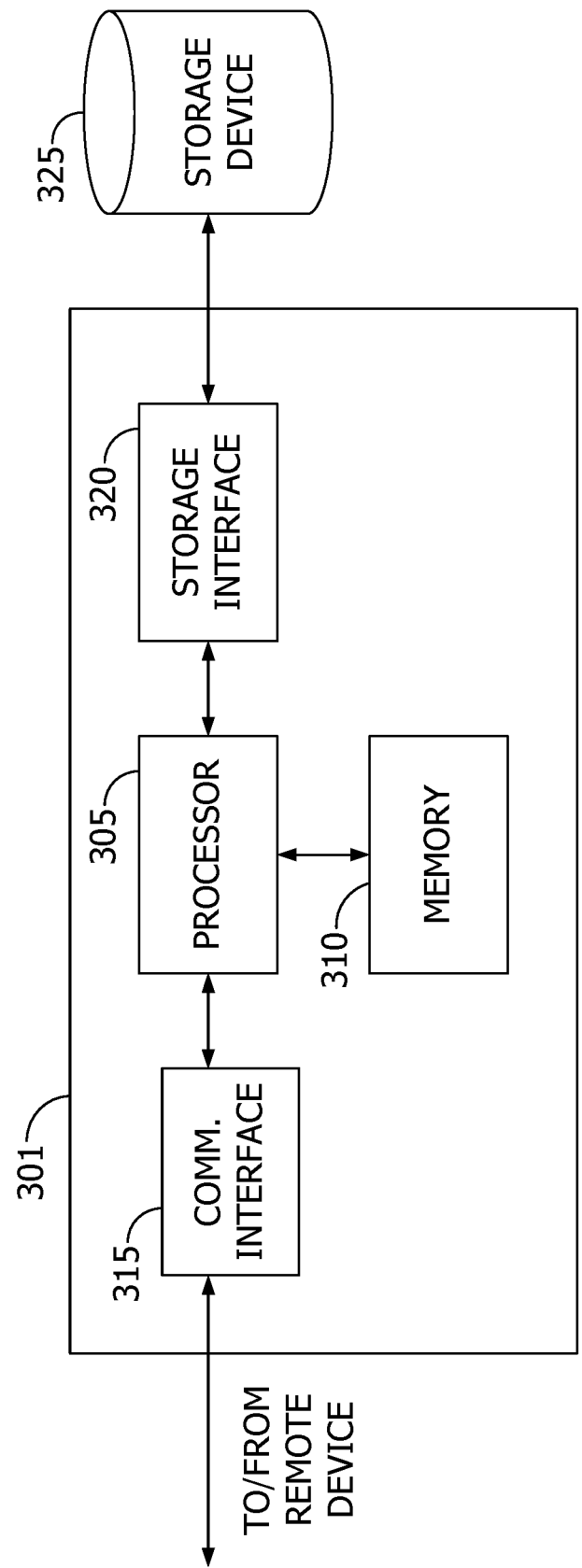

FIG. 3 illustrates an example configuration of a server computing device 302 such as analytics reporting computing device 102 and/or any reporting party computing device(s) 110 (both shown in FIG. 1). Server computing device 302 includes a processor 304 for executing instructions. Instructions may be stored in a memory area 306, for example. Processor 304 may include one or more processing units (e.g., in a multi-core configuration).

Processor 304 is operatively coupled to a communication interface 308 such that server computing device 302 is capable of communicating with a remote device such as client computing device 114 (shown in FIG. 1) and/or 202 (shown in FIG. 2) or another server computing device 302. For example, communication interface 308 may receive requests from client computing devices 114 and/or 202 via the Internet, as illustrated in FIG. 1.

Processor 304 may also be operatively coupled to a storage device 310. Storage device 310 is any computer-operated hardware suitable for storing and/or retrieving data. In some embodiments, storage device 310 is integrated in server computing device 302. For example, server computing device 302 may include one or more hard disk drives as storage device 310. In other embodiments, storage device 310 is external to server computing device 302 and may be accessed by a plurality of server computing devices 302. For example, storage device 310 may include multiple storage units such as hard disks or solid state disks in a redundant array of inexpensive disks (RAID) configuration. Storage device 310 may include a storage area network (SAN) and/or a network attached storage (NAS) system.

In some embodiments, processor 304 is operatively coupled to storage device 310 via a storage interface 312. Storage interface 312 is any component capable of providing processor 304 with access to storage device 310. Storage interface 312 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 304 with access to storage device 310.

Memory areas 210 (shown in FIG. 2) and 306 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of data and/or a computer program.

Figure 4:
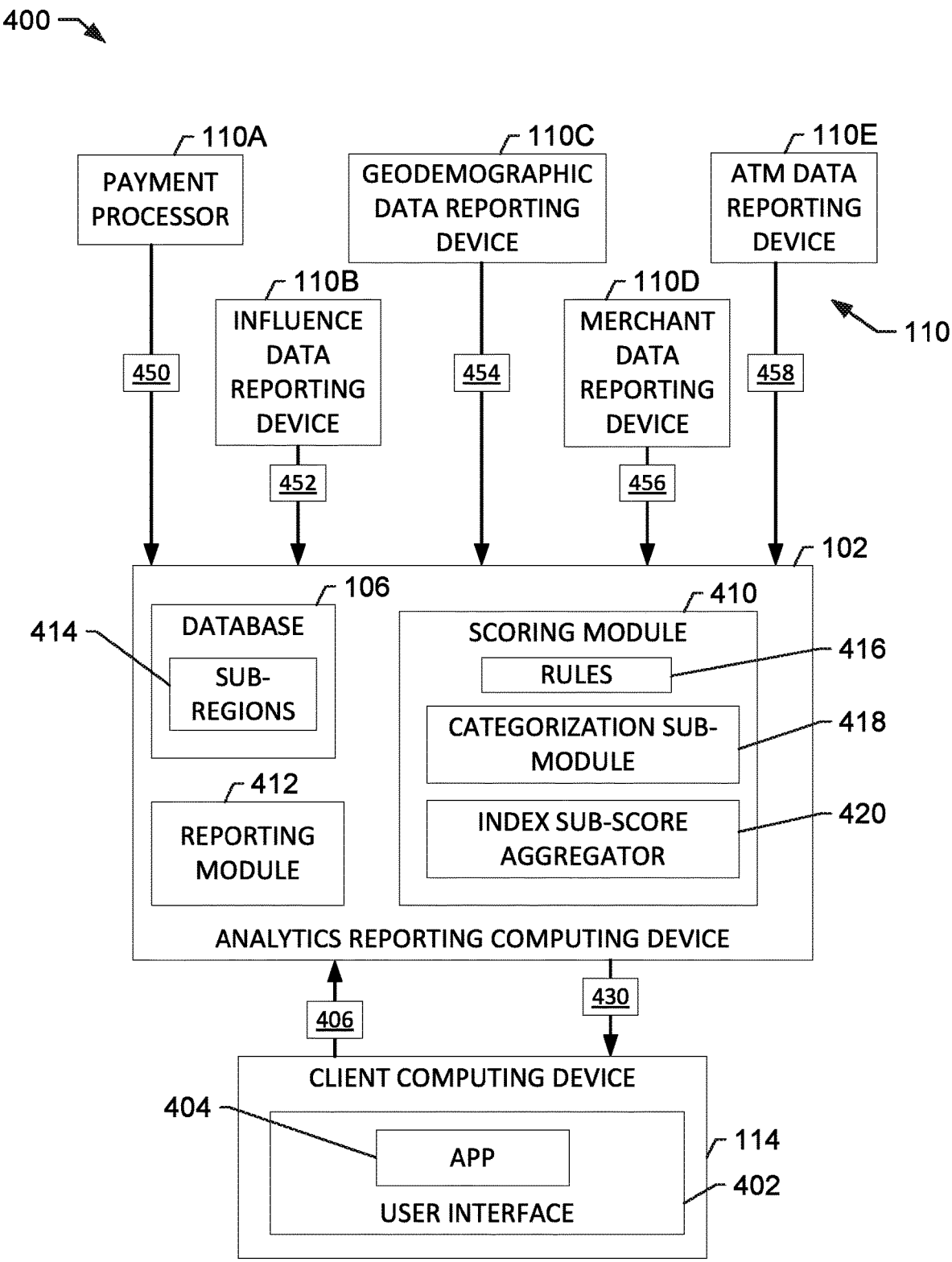

FIG. 4 is a diagram 400 illustrating the flow of information between components of region characterizing system 100 (shown in FIG. 1). As shown and described with respect to FIG. 1, analytics reporting computing device 102 is in communication with database 106, client computing device 114, and at least one reporting party computing device 114. In the illustrated embodiments, reporting party computing devices 110 include a payment processor 110A, an influence data reporting computing device 110B, a geodemographic data reporting computing device 110C, a merchant data reporting computing device 110D, and an ATM data reporting computing device 110E. It should be understood that analytics reporting computing device 102 may be in communication with fewer or more computing devices than illustrated in FIG. 4.

Client computing device 114, as illustrated, includes a user interface 402 configured to display and enable interaction with a software application or "app" 404. App 404 is maintained by region characterizing system 100 and facilitates communication of data between client computing device 114 and analytics reporting computing device 102. More particularly, a user (not shown) of client computing device 114 may use app 404 to request a region report ranking sub-regions (e.g., zip codes) within a geographic region of interest based upon how well those sub-regions score on certain region characteristics. Client computing device 114 transmits a request 406 to analytics reporting computing device 102. In one embodiment, request 406 includes a geographic region of interest identified by the user of client computing device 114, for example, a city, state, or county to which the user is re-locating. Request 406 may identify the geographic region by a name of the geographic region, coordinates bounding or encompassed by the geographic region, and/or other boundaries of the geographic region (e.g., between two rivers). Request 406 further includes one or more region characteristics selected by the user. These one or more selected region characteristics represent the region characteristics most valued or most "of interest" to the user. For example, a plurality of region characteristics may include average or median age (e.g., from lowest to highest or closest to a selected value), most common resident type (e.g., single, family, couples, etc.), lifestyle (e.g., professionals, students, homeowners, renters, transient, etc.), socioeconomic/income status (e.g., median income, purchasing power, proportion of higher-spending segments of a population, transaction size), employment levels, and/or merchant availability or variation. The user may select one or more of these region characteristics, indicating that the user is most interested in how the sub-regions compare with regard to that selected region characteristic. Request 406 may further include a time period identifier (e.g., a start date and an end date) specifying a time period in which the user of client computing device 114 is most interested (e.g., the past three months, the past year, etc.).

Analytics reporting computing device 102 is configured to retrieve, process, and analyze data from the reporting party computing devices 110 to generate an index score for each sub-region within the geographic region and rank the sub-regions according to the index score. As illustrated in FIG. 4, analytics reporting computing device 102 includes database 106, a scoring module 410, and a reporting module 412. Each module may include a distinct set of executable instructions executed by a processor of analytics reporting computing device 102 (e.g., processor 305, shown in FIG. 3). It should be understood that analytics reporting computing device 102 may include fewer, more, and/or alternative modules configured to implement the functionality described herein.

Database 106 includes a list or table of sub-regions 414 (E.g., a list of zip codes, zip+4 codes, etc.). Scoring module 410 accesses the list of sub-regions 414 to identify a plurality of sub-regions associated with the geographic region of interest included in request 406. For example, if the geographic region is a city, scoring module 410 may identifies all of the zip codes within the city. Subsequently, scoring module 410 accesses a plurality of scoring rules 416 that define how scoring module 410 processes incoming data to generate an index score for each sub-region. For example, rules 416 may include scoring algorithms, how to update the scoring algorithms based upon the selected region characteristics in request 406, how certain types of data affect an index score, how to calculate index sub-scores for particular region characteristics, and/or any other suitable scoring rule(s) 416.

Scoring module 410 further includes a categorization sub-module 418. Categorization sub-module 418 is configured to parse incoming data and sort or categorize the data according to rules 416. In the illustrated embodiment, analytics reporting computing device 102 retrieves transaction data 450 from payment processor 110A and influence data 452 from influence data reporting computing device 110B. Moreover, analytics reporting computing device 102 may additionally retrieve at least one of geodemographic data 454 from geodemographic data reporting computing device 110C, merchant data 456 from merchant data reporting computing device 110D, and/or ATM data 458 from ATM data reporting computing device 110E. In the example embodiment, analytics reporting computing device 102 may only request and/or retrieve data 450-458 for the identified sub-regions within the geographic region.

In the illustrated embodiment, categorization sub-module 418 is configured to process retrieved transaction data 450. Transaction data 450 is data associated with payment transactions received and processed over a payment processing network, by payment processor 110A. Transaction data 450 may include data identifying a cardholder and a merchant, an approximate merchant location (e.g., an address of a shopping center), a timestamp associated with the transaction, a point-of-sale (POS) terminal involved in the payment transaction, and/or SKU or item-level data identifying item(s) (e.g., products and/or services) purchased. In some embodiments, categorization sub-module 418 is configured to parse transaction data 450 to identify transactions sizes of transactions, wherein a "transaction size" metric is one example region characteristic. For example, categorization sub-module 418 may identify an average transaction size for an entire sub-region, a plurality of ranges of transaction sizes (and/or proportions thereof within a sub-region), a transaction size associated with a merchant or merchant type (e.g., restaurant, furniture retailer, clothing retailer, etc.), and/or any other transaction size metric. In some embodiments, categorization sub-module 418 is configured to parse transaction data 450 to identify types of purchases (e.g., high-end vs. economy), spending trends, and/or location traffic (e.g., number of transactions by sub-region, merchant, merchant type, etc.). Categorization sub-module 418 is configured to calculate and assign an index sub-score to each sub-region, the index sub-score associated with how the sub-region compares to other sub-regions within the geographic region on the region characteristic of a "transaction size" metric. In one example, a higher "transaction size" index sub-score may be assigned to zip code with higher average transaction sizes.

In certain embodiments, categorization sub-module 418 is configured to parse transaction data 450 to identify a plurality of spending bands representing spending behaviors of residents (e.g., cardholders) within the geographic region and/or each sub-region therein. A "spending band" metric is one example region characteristic. Each spending band represents a range of an average monthly spend or "purchasing power." Purchasing power represents an average spend by cardholders on cardable purchases, therefore not including amounts spent on rents or mortgages. Purchasing power may serve as a proxy for income and/or "affluence," as it may be assumed that residents who spend more are residents that earn more. One sub-region may include ten spending bands, for example, with ranges defined by categorization sub-module 418. Table I below lists one example definition of a plurality of spending bands, although it should be understood that any definition of and/or number of spending bands may be implemented without departing from the scope of the present disclosure.

TABLE I

Example Definition of Spending Bands

| Spending Band | Purchasing Power Range (in $) |
|---|---|
| A | <100 |
| B | 101-150 |
| C | 151-250 |
| D | 251-500 |
| E | 501-750 |
| F | 751-1000 |
| G | 1001-1500 |
| H | 1501-2000 |
| I | 2001-3000 |
| J | >3000 |

In some embodiments, categorization sub-module 418 is further configured to determine relative proportions of each spending band within each sub-region. In other words, categorization sub-module 418 determines a proportion of the population of the sub-region with a particular purchasing power that falls within each spending band. Categorization sub-module 418 is configured to calculate and assign an index sub-score to each sub-region, the index sub-score associated with how the sub-region compares to other sub-regions within the geographic region on the region characteristic of a "spending band" metric (e.g., proportions of spending bands). In one example, higher "spending band" index sub-scores may be assigned to sub-regions with greater proportions of higher spending bands. In another example, higher "spending band" index sub-scores may be assigned to sub-regions with more even proportions of spending bands (e.g., indicating a more economically diverse population).

In the illustrated embodiment, categorization sub-module 418 is further configured to process retrieved influence data 452. Influence data 452 includes electronic data about the geographic region that is derived from social, cultural, and/or other not specifically economic behavior, specifically online behavior. Influence data 452 may include, but is not limited to, most-visited locations within the geographic region (e.g., check-ins), trends, particular preferred brands, interests/likes within the geographic region, and/or information from local influencers (e.g., local users with social influence). Influence data 452 may be an indicator of the behaviors and lifestyle of people in the geographic region. Influence data 452 is generated based on user behavior on social networks and other online behavior (e.g., searches, visited webpages, comments/shares, etc.) and collected by influence data reporting computing device 110B, with permission from the online users. In some embodiments, categorization sub-module 418 is configured to parse influence data 452 to identify a plurality of brand interest trends within the geographic region. A "brand interest" metric is one example region characteristic. Brand interest trends may include most popular brands, newly popular brands, and/or brands decreasing in popularity.

Moreover, categorization sub-module 418 may be configured to match each brand interest trend to one or more of the plurality of spending bands, described above. In other words, categorization sub-module 418 determines which segment of the population of the geographic region (as identified by their purchasing power within a spending band) prefers, is starting to prefer, or is losing preference for a particular brand. Categorization sub-module 418 may be further configured to cross-reference brand interest trends with transaction data 450 to match brand interest trends to spending bands. Categorization sub-module 418 may then determine one or more most common brand interest trends associated with each at least one sub-region, based upon the respective proportion of the plurality of spending bands within the sub-region. In other words, categorization sub-module 418 determines which spending bands are most represented in the sub-region, determines which brand interest trends are attributable to those spending bands, and designates those brand interest trends as the most common for the sub-region. Categorization sub-module 418 is configured to calculate and assign an index sub-score to each sub-region, the index sub-score associated with how the sub-region compares to other sub-regions within the geographic region on the region characteristic of a "brand interest" metric. In one example, higher "brand interest" index sub-scores may be assigned to sub-regions with higher-end brands of interest.

Categorization sub-module 418 may be further configured to process geodemographic data 454 retrieved from geodemographic data reporting computing device 110C. Geodemographic data reporting computing device 110C may be associated with a credit reporting agency, census bureau, or other third party that collects demographic/socioeconomic data. Geodemographic data 454 includes "demographic data" and/or "socioeconomic data" associated with the geographic region. Geodemographic data may include census data. Geodemographic data includes, for example, age groups, family/household sizes, income, education, gender, occupation, marital status, living situation (e.g., renter vs. homeowner), vehicle situation (e.g., owning a car vs. not owning a car, type/make/model of car, year of car), population density, housing type (single-family vs. multi-family, vacancy levels, etc.), and labor force information (e.g., employment levels).

In particular, categorization sub-module may parse geodemographic data 454 to determine one or more common resident types of the population of the geographic region (and of each sub-region therein), wherein a "resident type" metric is one example region characteristic. Resident types may describe, for example, family status (e.g., singles, family sizes), age ranges or median/average ages, professions, common housing types, and/or employment levels. Categorization sub-module 418 is configured to calculate and assign an index sub-score to each sub-region, the index sub-score associated with how the sub-region compares to other sub-regions within the geographic region on the region characteristic of a "resident type" metric. In one example, higher "resident type" index sub-scores may be assigned to sub-regions with resident types most similar to the user of client computing device 114. In these cases, categorization sub-module 418 may be configured to request profile information from the user and/or retrieve profile information from a user profile of the user within app 404. Categorization sub-module 418 may determine a "resident type" of the user based upon the profile information. In another example, higher "resident type" index sub-scores may be assigned to sub-regions with resident types most similar to a "preferred" resident type, as indicated by the user in request 406. For instance, the user may prefer to live in a quieter neighborhood and accordingly may indicate a "preferred" resident type of singles and/or elderly residents. In yet another example, higher "resident type" index sub-scores may be assigned to sub-regions with the widest variety of resident types (e.g., indicating a more socially diverse population). Categorization sub-module 418 may parse geodemographic data 454 for additional and/or alternative categories or region characteristics of the geographic region, the population thereof, and/or sub-regions therein.

Categorization sub-module 418 may be further configured to process merchant data 456 retrieved from merchant data reporting computing device 110D. Merchant data 456 includes data about merchants within the geographic region, which includes merchants associated with transactions initiated within the geographic region. Categorization sub-module 418 may parse merchant data 456 to determine, for example, most commonly visited merchants, prevalent merchant industries, and most-used and/or most available channels (e.g., brick-and-mortar vs. online) within the geographic region and/or the zip codes therein. Any of these "merchant characteristic" metrics may be one example of a region characteristic. Categorization sub-module 418 is configured to calculate and assign an index sub-score to each sub-region, the index sub-score associated with how the sub-regions compares to other zip codes within the geographic region on the region characteristic of a "merchant characteristic" metric. In one example, higher "merchant characteristic" index sub-scores may be assigned to sub-regions with a greater variety of merchants. In another example, higher "merchant characteristic" index sub-scores may be assigned to sub-regions with a higher number of a "preferred" merchant type, as indicated by the user in request 406. For instance, if the user would like to live in a neighborhood with many shops and/or restaurants, the user may indicate that retail and/or restaurant merchants are "preferred" merchant types.

Categorization sub-module 418 may additionally be configured to process ATM data 458 retrieved from ATM data reporting computing device 110E. ATM data 458 includes data about ATMs within the geographic region. ATM data 458 includes, for example, locations of specific ATMs, a number of ATMs, ATM types (financial institute, university, etc.), acquirer information associated with ATMs, owner information associated with ATMs, and accessibility (inside vs. outside, handicap accessible, etc.). Categorization module 418 may parse ATM data 456 to determine the most common characteristics shared by ATMs within each sub-region, and/or an ATM prevalence or accessibility index sub-score. Categorization sub-module 418 is configured to calculate and assign an index sub-score to each sub-region, the index sub-score associated with how the sub-region compares to other sub-regions within the geographic region on the region characteristic of an "ATM prevalence" or "ATM accessibility" metric. In one example, higher "ATM prevalence" index sub-scores may be assigned to sub-regions with higher numbers of ATMs. In another example, higher "ATM accessibility" index sub-scores may be assigned to sub-regions with ATMs having a greater number of accessibility features and/or a greater number of accessible ATMs.

Index sub-score aggregator 420 is configured to aggregate one or more index sub-scores for each sub-region into a total index score. Index sub-sore aggregator 420 is configured to access rules 416 to determine how to aggregate the index sub-scores. For example, rules 416 may indicate that the index sub-scores associated with the region characteristic(s) selected by the user (identified in request 406) should be weighted in a particular manner. As another example, rules 416 may indicate that certain index sub-scores should be weighted differently when certain other index sub-scores are unavailable and/or were not calculated by categorization sub-module 418. Index sub-score aggregator 420 may include and/or access one or more aggregation algorithms to aggregate the index sub-scores for each sub-region into a total index score. In addition, index sub-score aggregator 420 may update a previously calculated index score based upon a newly calculated or updated index sub-score (e.g., output from categorization sub-module 418). In some embodiments, index sub-score aggregator 420 is configured to monitor calculated index scores and/or index sub-scores for changes. If an index score (and/or one or more index sub-scores) for a sub-region change a threshold amount, falls below a minimum threshold value, and/or reaches above a maximum threshold value, index sub-score aggregator 420 is configured to generate an alert identifying the significant change. Index sub-score aggregator 420 may transmit the alert to reporting module 422 for transmission to client computing device 114.

In the illustrated embodiment, index sub-score aggregator 420 transmits the total index score for each sub-region to reporting module 412. Reporting module 412 is configured to generate and format a region report 430 for transmission to client computing device 114. In the example embodiment, reporting module 412 formats region report 430 for display at client computing device 114 within app 404. Region report 430 includes the index scores for one or more sub-regions within the geographic region identified in request 406. Reporting module 412 is configured to format the index scores for display. In one embodiment, the index scores may displayed in a list or table, with the sub-regions sorted in descending order according to index score. In another embodiment, the index scores may be displayed as a bar chart or other chart or graph. In another embodiment, the index scores may be displayed on a map, where each sub-regions within the geographic region is graphically shown on the map and the corresponding index scores are graphically displayed in association with the sub-regions (e.g., as a number, as a color or shade, etc.). In some embodiments, reporting module 412 may format region report 430 such that the user of client computing device 114 may view an itemized breakdown of each index sub-score that make up the total index score. Reporting module 412 causes region report 430 to be transmitted to client computing device 114 for display to a user thereof (e.g., within app 404).

In certain embodiments, reporting module 412 may additionally or alternatively format certain index sub-scores and/or metrics associated therewith to be displayed. For example, reporting module 412 may append a resident characterization to region report 430, the resident characterization associated with the "resident type" metric. The resident characterization may enable the user of client computing device 114 to see an itemized breakdown of the types of residents within each sub-region at a more granular level than an index sub-score. Reporting module 412 may display the resident types in the resident characterization as a list or table, as a pie chart or other chart or graph, and/or in any other display format. As another example, reporting module 412 may append a brand map to region report 430. The brand map is associated with the "brand interest" metrics. The brand map may enable the user of client computing device 114 to see an itemized breakdown of the particular popular brands and/or where they are popular or available within the geographic region. Reporting module 412 may display the brands in the brand map as on an actual graphical map of the geographic region, in a list or table, in a chart or graph, and/or in any other display format.

In some embodiments, analytics reporting computing device 102 may be configured to request, retrieve, and/or receive additional, alternative, and/or supplemental data from one or more reporting party computing devices 110. For example, supplemental data may include data pertaining to crime statistics, housing prices, construction projects, school ratings, demographics, and weather for the geographic region (e.g., the geographic region identified by in request 406). Analytics reporting computing device 102 may request, retrieve, and/or receive the supplemental data from reporting party computing devices 110 such as a government-related computing device with demographic information, a real estate computing device with data pertaining to housing prices and new construction projects, a meteorological computing device associated with a weather station, etc.

It should be understood that although higher scores are described herein as indicating "better" sub-regions (compared to other sub-regions for the same region characteristic), alternative embodiments may have lower scores indicating "better" sub-regions. The examples given herein should not be taken to limit the scope of the present disclosure, as they are for illustrative purposes only.

FIG. 5 is a flowchart of an example method 500 of generating a region report of a predefined geographic region. Method 500 may be implemented using region characterizing system 100 (shown in FIG. 1). For example, at least some of the steps of method 500 may be performed using analytics reporting computing device 102 (also shown in FIG. 1).

Method 500 includes receiving 502 a request (e.g., request 406, shown in FIG. 4) for a region report from a client computing device (e.g., client computing device 114, shown in FIG. 1), the region report request identifying a predefined geographic region including a plurality of sub-regions and at least one selected region characteristic selected by a user of the client computing device. Method 500 also includes identifying 504 each sub-region included within the predefined geographic region (e.g., using the list or table of sub-regions 414, shown in FIG. 4).

Method 500 also includes retrieving 506 transaction data (e.g., transaction data 450, shown in FIG. 4) representing a plurality of financial transactions initiated by a plurality of cardholders at a plurality of merchants within each identified sub-region. Transaction data may be retrieved from a payment processor (e.g., payment processor 110A, shown in FIG. 1). Method 500 further includes retrieving 508 influence data (e.g., influence data 452, shown in FIG. 4) data associated with the predefined geographic region, the influence data including electronic data representing user online social behavior relating to the predefined geographic region. Influence data may be retrieved from an influence data reporting computing device (e.g., influence data reporting computing device 110B, also shown in FIG. 4).

Method 500 includes, for each identified sub-region, determining 510 a respective index score of the at least one selected region characteristic based upon respective portions of the transaction data and influence data associated with each identified sub-region. Method 500 further includes generating 512 the region report (e.g., region report 430, shown in FIG. 4), wherein the region report ranks each of the identified sub-regions according to the respective index scores of the at least one selected region characteristic, and transmitting 514 the region report to the client computing device for display (e.g., within app 404, also shown in FIG. 4). Method 500 may include additional, fewer, and/or alternative steps, including those described elsewhere herein.

Figure 6:
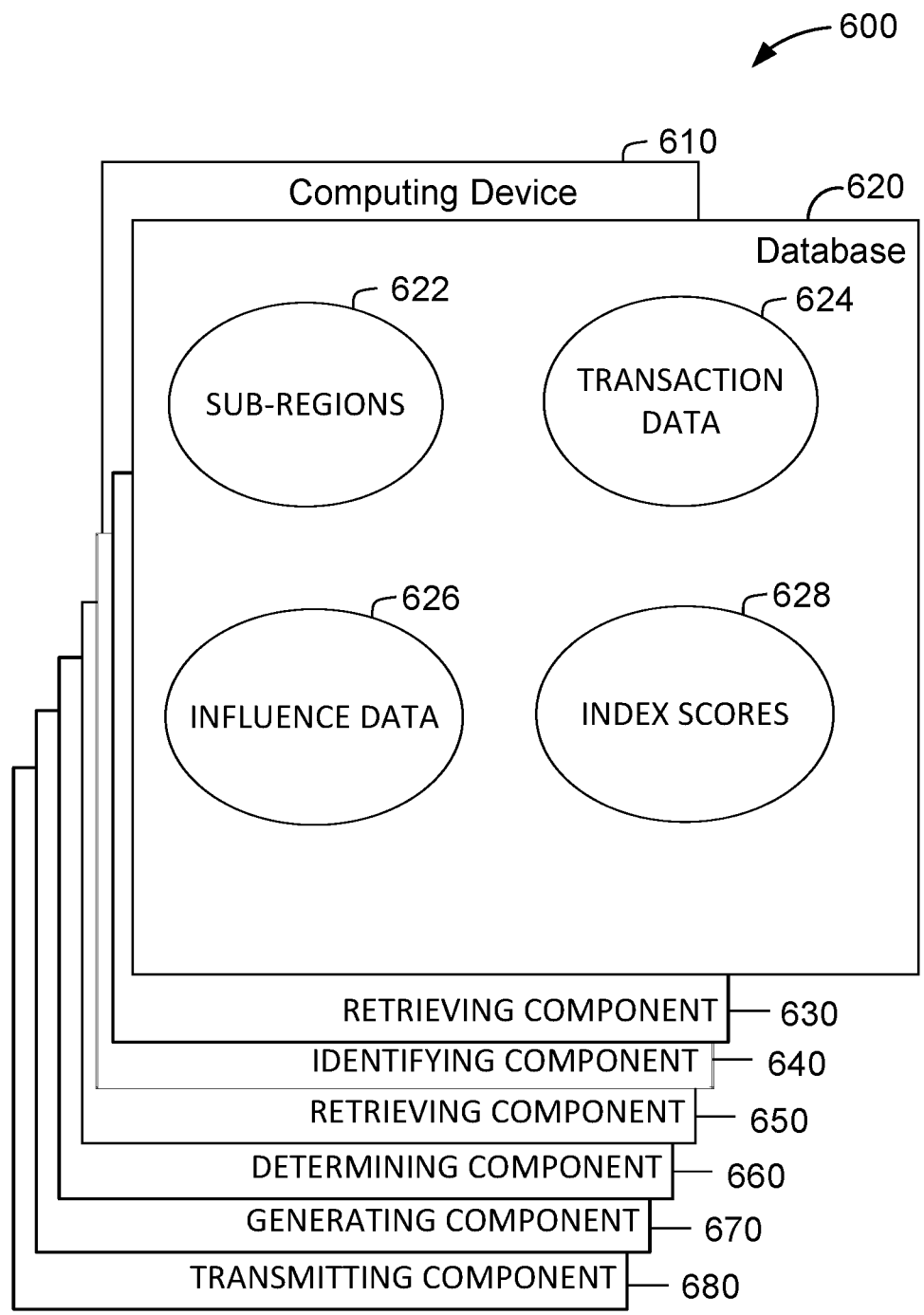

FIG. 6 is a diagram 600 of components of one or more example computing devices 610 that may be used in region characterizing system 100 (shown in FIG. 1) to generate region reports and rank sub-regions within a geographic region. In some embodiments, computing device 610 is similar to analytics reporting computing device 102 (also shown in FIG. 1). Computing device 610 includes a database 620, which may be similar to database 106 (also shown in FIG. 1). In the example embodiment, database 620 includes a list or table of sub-regions 622, retrieved and stored transaction data 624, retrieved and stored influence data 626, and calculated index scores 628. Database 620 may include more or less information, including other information used in generating region reports as described elsewhere herein. Database 620 is coupled to several separate components within computing device 610, which perform specific tasks.

In particular, computing device 610 includes a receiving component 630. Receiving component 630 is configured to receive a request for a region report from a client computing device, the region report request identifying a predefined geographic region including a plurality of sub-regions 622 and at least one selected region characteristic selected by a user of the client computing device. It should be understood that receiving component 630 may include and/or be integral to any kind of communication device (e.g., a transceiver). Computing device 610 also includes an identifying component 640, configured to identify each sub-region 622 included within the predefined geographic region.

Computing device 610 includes a retrieving component 650 is further configured to retrieve transaction data 624 representing a plurality of financial transactions initiated by a plurality of cardholders at a plurality of merchants within each identified sub-region 622, and retrieve influence data 626 associated with the predefined geographic region, the influence data including electronic data representing user online social behavior relating to the predefined geographic region. Retrieving component 650 is configured to retrieve other kinds of data from any source, including as described elsewhere herein.

Computing device 610 also includes a determining component 660. Determining component 660 is configured to determine, for each identified sub-region 622, a respective index score 628 of the at least one selected region characteristic based upon respective portions of the transaction data 624 and influence data 626 associated with each identified sub-region 622. Determining component 660 may use any data input to determine an index score 628, as described herein.

Computing device 610 further includes a generating component 670 configured to generate the region report. The region report ranks each of the identified sub-regions 622 according to the respective index scores 628 of the at least one selected region characteristic. Computing device 610 also includes a transmitting component 680 configured to transmit the region report to the client computing device for display. It should be understood that transmitting component 680 may include and/or be integral to any kind of communication device (e.g., a transceiver).

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described embodiments of a method and system for generating a region report ranking sub-regions within a geographic region utilizing electronic transaction data and influence data. The region report provides a person interested in living in or establishing a business in the geographic region with information regarding the people living in the geographic region and sub-regions (e.g., zip codes) within the geographic region, and associated information that would be difficult to obtain without physically visiting the region and researching information from multiple different sources.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An analytics reporting computing device for generating a region report of a predefined geographic region, said analytics reporting computing device comprising a processor coupled to a memory, said analytics reporting computing device configured to:

receive a request for a region report from within a software application executed on a client computing device, the software application communicatively coupling the client computing device to the analytics reporting computing device, the region report request identifying a predefined geographic region including a plurality of sub-regions and at least one selected region characteristic selected by a user of the client computing device;

identify each sub-region included within the predefined geographic region;

retrieve, from a payment processor of a payment processing network, transaction data for only the identified sub-regions, the transaction data generated during a plurality of electronic financial transactions initiated by a plurality of cardholders at a plurality of merchants within each identified sub-region and processed as a plurality of electronic transaction messages over the payment processing network by the payment processor, the plurality of electronic transaction messages stored at the payment processor in an anonymized or encrypted format for subsequent retrieval as the transaction data;

parse the transaction data for portions of the transaction data associated with the at least one selected region characteristic;

retrieve influence data associated with the predefined geographic region, the influence data including electronic data representing user online social behavior conducted within the predefined geographic region;

for each identified sub-region, determine a respective index score of the at least one selected region characteristic based upon respective portions of the influence data associated with each identified sub-region and respective portions of the transaction data and associated with the at least one selected region characteristic representing financials transaction conducted within each identified sub-region;

rank each of the identified sub-regions against all other identified sub-regions within the predefined geographic region according to the respective index scores of the at least one selected region characteristic;

generate the region report, wherein the region report includes a visual representation of the ranked identified sub-regions visually organized to readily identify one or more highest ranked identified sub-regions to a user of the client computing device, and wherein the region report further includes the respective index score for each ranked identified sub-region displayed in association with the corresponding ranked identified sub-region;

format the region report for display at the client computing device within the software application executed on the client computing device;

transmit the region report to the client computing device for display;

monitor periodically calculated updated index scores for each identified sub region;

compare each respective updated index score to at least one threshold value criterion; and when any updated index score reaches the at least one threshold value criterion, transmit an alert to the client computing device.

2. The analytics reporting computing device of claim 1 further configured to:

retrieve geodemographic data representing demographic and socioeconomic characteristics of the predefined geographic region;

for each identified sub-region, determine a respective index sub-score associated with another region characteristic based upon a respective portion of the geodemographic data associated with each identified sub-region; and update the respective index score of each identified sub-region based upon the respective index sub-score.

3. The analytics reporting computing device of claim 1 further configured to:

retrieve merchant data representing characteristics of the plurality of merchants within the predefined geographic region;

for each identified sub-region, determine a respective index sub-score associated with another region characteristic based upon a respective portion of the merchant data associated with each identified sub-region; and update the respective index score of each identified sub-region based upon the respective index sub-score.

4. The analytics reporting computing device of claim 1 further configured to:

retrieve automated teller machine (ATM) data representing characteristics of a plurality of ATMs within the predefined geographic region;

for each identified sub-region, determine a respective index sub-score associated with another region characteristic based upon a respective portion of the ATM data associated with each identified sub-region; and update the respective index score of each identified sub-region based upon the index sub-score.

5. The analytics reporting computing device of claim 1 further configured to:

define a plurality of spending bands, each spending band representing a respective average monthly spend of a respective portion the plurality of cardholders within the predefined geographic region;

process the transaction data to determine, for each identified sub-region, a respective proportion of the transaction data attributable to each spending band of the plurality of spending bands within the identified sub-region;

for each identified sub-region, determine a respective index sub-score associated with another region characteristic based upon the respective proportions of the spending bands within each identified sub-region; and update the respective index score of each identified sub-region based upon the respective index sub-score for each identified sub-region.

6. The analytics reporting computing device of claim 5 further configured to:

process the influence data to identify a plurality of brand interest trends within the predefined geographic region;

identify one or more of the plurality of spending bands associated with each brand interest trend of the plurality of brand interest trends;

determine one or more most common brand interest trends associated with each identified sub-region based upon the respective proportion of the plurality of spending bands within each identified sub-region; and append a brand map to the region report, the brand map identifying the one or more most common brand interest trends associated with each identified sub-region identified in the region report.

7. The analytics reporting computing device of claim 1, wherein each sub-region includes a zip code.

8. A method for ranking sub-regions within a predefined geographic region, said method implemented by an analytics reporting computing device including one or more processors in communication with a memory, said method comprising:

receiving a request for a region report from within a software application executed on a client computing device, the software application communicatively coupling the client computing device to the analytics reporting computing device, the region report request identifying a predefined geographic region including a plurality of sub-regions and at least one selected region characteristic selected by a user of the client computing device;

identifying each sub-region included within the predefined geographic region;

retrieving, from a payment processor of a payment processing network, transaction data for only the identified sub-regions, the transaction data generated during a plurality of electronic financial transactions initiated by a plurality of cardholders at a plurality of merchants within each identified sub-region and processed as a plurality of electronic transaction messages over the payment processing network by the payment processor, the plurality of electronic transaction messages stored at the payment processor in an anonymized or encrypted format for subsequent retrieval as the transaction data;

parsing the transaction data for portions of the transaction data associated with the at least one selected region characteristic;

retrieving influence data associated with the predefined geographic region, the influence data including electronic data representing user online social behavior conducted within the predefined geographic region;

for each identified sub-region, determining a respective index score of the at least one selected region characteristic based upon respective portions of the influence data associated with each identified sub-region and respective portions of the transaction data and associated with the at least one selected region characteristic representing financials transaction conducted within each identified sub-region;

ranking each of the identified sub-regions against all other identified sub-regions within the predefined geographic region according to the respective index scores of the at least one selected region characteristic;

generating the region report, wherein the region report includes a visual representation of the ranked identified sub-regions visually organized to readily identify one or more highest ranked identified sub-regions to a user of the client computing device, and wherein the region report further includes the respective index score for each ranked identified sub-region displayed in association with the corresponding ranked identified sub-region;

formatting the region report for display at the client computing device within the software application executed on the client computing device;

transmitting the region report to the client computing device for display;

monitoring periodically calculated updated for each identified sub region;

comparing each respective updated index score to at least one threshold value criterion; and when any updated index score reaches the at least one threshold value criterion, transmitting an alert to the client computing device.

9. The method of claim 8 further comprising:
retrieving geodemographic data representing demographic and socioeconomic characteristics of the predefined geographic region;

for each identified sub-region, determining a respective index sub-score associated with another region characteristic based upon a respective portion of the geodemographic data associated with each identified sub-region; and updating the respective index score of each identified sub-region based upon the respective index sub-score.

10. The method of claim 8 further comprising:
retrieving merchant data representing characteristics of the plurality of merchants within the predefined geographic region;

for each identified sub-region, determining a respective index sub-score associated with another region characteristic based upon a respective portion of the merchant data associated with each identified sub-region; and updating the respective index score of each identified sub-region based upon the respective index sub-score.

11. The method of claim 8 further comprising:
retrieving automated teller machine (ATM) data representing characteristics of a plurality of ATMs within the predefined geographic region;

for each identified sub-region, determining a respective index sub-score associated with another region characteristic based upon a respective portion of the ATM data associated with each identified sub-region; and updating the respective index score of each identified sub-region based upon the respective index sub-score.

12. The method of claim 8 further comprising:
defining a plurality of spending bands, each spending band representing a respective average monthly spend of a respective portion the plurality of cardholders within the predefined geographic region;

processing the transaction data to determine, for each identified sub-region, a respective proportion of the transaction data attributable to each spending band of the plurality of spending bands within the identified sub-region;

for each identified sub-region, determining a respective index sub-score associated with another region characteristic based upon the respective proportions of the spending bands within each identified sub-region; and updating the respective index score of each identified sub-region based upon the respective index sub-score for each identified sub-region.

13. A non-transitory computer-readable storage medium having computer-executable instructions embodied thereon, wherein when executed by a analytics reporting computing device including at least one processor coupled to a memory, the computer-executable instructions cause the analytics reporting computing device to:

receive a request for a region report from within a software application executed on a client computing device, the software application communicatively coupling the client computing device to the analytics reporting computing device, the region report request identifying a predefined geographic region including a plurality of sub-regions and at least one selected region characteristic selected by a user of the client computing device;

identify each sub-region included within the predefined geographic region;

retrieve, from a payment processor of a payment processing network, transaction data for only the identified sub-regions, the transaction data generated during a plurality of electronic financial transactions initiated by a plurality of cardholders at a plurality of merchants within each identified sub-region and processed as a plurality of electronic transaction messages over the payment processing network by the payment processor, the plurality of electronic transaction messages stored at the payment processor in an anonymized or encrypted format for subsequent retrieval as the transaction data;

parse the transaction data for portions of the transaction data associated with the at least one selected region characteristic;

retrieve influence data associated with the predefined geographic region, the influence data including electronic data representing user online social behavior conducted within the predefined geographic region;

for each identified sub-region, determine a respective index score of the at least one selected region characteristic based upon respective portions of the influence data associated with each identified sub-region and respective portions of the transaction data and associated with the at least one selected region characteristic representing financials transaction conducted within each identified sub-region;

rank each of the identified sub-regions against all other identified sub-regions within the predefined geographic region according to the respective index scores of the at least one selected region characteristic;

generate the region report, wherein the region report includes a visual representation of the ranked identified sub-regions visually organized to readily identify one or more highest ranked identified sub-regions to a user of the client computing device, and wherein the region report further includes the respective index score for each ranked identified sub-region displayed in association with the corresponding ranked identified sub-region;

format the region report for display at the client computing device within the software application executed on the client computing device;

transmit the region report to the client computing device for display;

monitor periodically calculated updated index scores for each identified sub region;

compare each respective updated index score to at least one threshold value criterion; and when any updated index score reaches the at least one threshold value criterion, transmit an alert to the client computing device.

14. The computer-readable storage medium of claim 13, wherein said computer-executable instructions further cause the analytics reporting computing device to:

retrieve geodemographic data representing demographic and socioeconomic characteristics of the predefined geographic region;

for each identified sub-region, determine a respective index sub-score associated with another region characteristic based upon a respective portion of the geodemographic data associated with each identified sub-region; and update the respective index score of each identified sub-region based upon the respective index sub-score.

15. The computer-readable storage medium of claim 13, wherein said computer-executable instructions further cause the analytics reporting computing device to:

retrieve merchant data representing characteristics of the plurality of merchants within the predefined geographic region;

for each identified sub-region, determine a respective index sub-score associated with another region characteristic based upon a respective portion of the merchant data associated with each identified sub-region; and update the respective index score of each identified sub-region based upon the respective index sub-score.

16. The computer-readable storage medium of claim 13, wherein said computer-executable instructions further cause the analytics reporting computing device to:

define a plurality of spending bands, each spending band representing a respective average monthly spend of a respective portion the plurality of cardholders within the predefined geographic region;

process the transaction data to determine, for each identified sub-region, a respective proportion of the transaction data attributable to each spending band of the plurality of spending bands within the identified sub-region;

for each identified sub-region, determine a respective index sub-score associated with another region characteristic based upon the respective proportions of the spending bands within each identified sub-region; and update the respective index score of each identified sub-region based upon the respective index sub-score for each identified sub-region.

17. The analytics reporting computing device of claim 1 further configured to retrieve the influence data from an influence data reporting computing device that collects influence data generated based on user behavior on social network and other online user behavior.

18. The analytics reporting computing device of claim 1 further configured to:

display the ranked identified sub-regions within a map of the predefined geographic region; and display the respective index scores graphically represented on the map as respective colors or shades.

19. The analytics reporting computing device of claim 18 further configured to:

receive the region report request further including a plurality of selected region characteristics and a user-selected weighting of the plurality of selected region characteristics;

for each identified sub-region, determine a respective index sub-score for each of the plurality of selected region characteristics based upon the respective portions of the transaction data and influence data associated with each identified sub-region;

rank each of the identified sub-regions against all other identified sub-regions within the predefined geographic region according to the respective index score of each identified sub-region;

generate the region report including the respective index sub-scores for each of the plurality of selected region characteristics for each ranked identified sub-region; and in response to a user selection of one index score displayed on the map, display an itemized breakdown of the respective index sub-scores used to determine that index score.

* * * * *